United States Patent
Fyke et al.

(10) Patent No.: US 8,411,035 B2
(45) Date of Patent: *Apr. 2, 2013

(54) HANDHELD ELECTRONIC DEVICE, CURSOR POSITIONING SUB-SYSTEM AND METHOD EMPLOYING CURSOR SCALING CONTROL

(75) Inventors: Steven H. Fyke, Waterloo (CA); Vahid Moosavi, Kitchener (CA)

(73) Assignee: Research In Motion Limited, Waterloo (CA)

( * ) Notice: Subject to any disclaimer, the term of this patent is extended or adjusted under 35 U.S.C. 154(b) by 358 days.

This patent is subject to a terminal disclaimer.

(21) Appl. No.: 12/722,213

(22) Filed: Mar. 11, 2010

(65) Prior Publication Data

US 2010/0164866 A1 Jul. 1, 2010

Related U.S. Application Data

(63) Continuation of application No. 11/062,719, filed on Feb. 22, 2005, now Pat. No. 7,724,239.

(51) Int. Cl.
*G09G 5/08* (2006.01)
(52) U.S. Cl. .................................................... 345/159
(58) Field of Classification Search ................ 345/159, 345/157
See application file for complete search history.

(56) References Cited

U.S. PATENT DOCUMENTS

| | | | |
|---|---|---|---|
| 4,734,685 A | 3/1988 | Watanabe | |
| 4,887,968 A | 12/1989 | Wickstead et al. | |
| 5,195,179 A | 3/1993 | Tokunaga | |
| 5,477,508 A | 12/1995 | Will | |
| 5,990,869 A | 11/1999 | Kubica et al. | |
| 6,064,387 A | 5/2000 | Canaday et al. | |
| 6,252,579 B1* | 6/2001 | Rosenberg et al. | 715/856 |
| 6,300,936 B1 | 10/2001 | Braun et al. | |
| 6,452,588 B2 | 9/2002 | Griffin et al. | |

(Continued)

FOREIGN PATENT DOCUMENTS

| | | |
|---|---|---|
| DE | 19855022 A1 | 5/2000 |
| EP | 0631223 A | 12/1994 |
| JP | 2000148350 A | 5/2000 |

OTHER PUBLICATIONS

EP05251001.3 Examination Report (Apr. 9, 2008).

(Continued)

*Primary Examiner* — Amr Awad
*Assistant Examiner* — Randal Willis
(74) *Attorney, Agent, or Firm* — Novak Druce Connolly Bove + Quigg LLP

(57) ABSTRACT

A track ball cursor positioning sub-system is employed by a handheld electronic device including an operating system and a plurality of applications having a plurality of predetermined scaling values. The cursor positioning sub-system includes a track ball cursor positioning device adapted to output a plurality of device pulses, and a track ball cursor resolution controller adapted to repetitively input the device pulses and to responsively output to the operating system a plurality of cursor movement events. The cursor resolution controller is further adapted to be controlled by the operating system or by the applications to learn which one of the applications is active and to automatically scale a number of the cursor movement events for a corresponding number of the device pulses based upon a corresponding one of the predetermined scaling values of the active one of the applications.

20 Claims, 3 Drawing Sheets

U.S. PATENT DOCUMENTS

| | | | |
|---|---|---|---|
| 6,489,950 | B1 | 12/2002 | Griffin et al. |
| 6,493,008 | B1 | 12/2002 | Yui |
| 6,947,028 | B2 | 9/2005 | Shkolnikov |
| 7,120,473 | B1 | 10/2006 | Hawkins et al. |
| 7,365,737 | B2 | 4/2008 | Marvit et al. |
| 7,724,239 | B2 * | 5/2010 | Fyke et al. .................... 345/167 |
| 2002/0054021 | A1 | 5/2002 | Rosenberg et al. |
| 2002/0067336 | A1 | 6/2002 | Wegmuller et al. |
| 2002/0084982 | A1 | 7/2002 | Rosenberg |
| 2002/0084985 | A1 | 7/2002 | Hesley et al. |
| 2002/0118168 | A1 | 8/2002 | Hinckley et al. |
| 2002/0130837 | A1 | 9/2002 | Johnston, Jr. et al. |
| 2003/0076301 | A1 * | 4/2003 | Tsuk et al. .................... 345/159 |
| 2004/0051695 | A1 | 3/2004 | Yamamoto et al. |
| 2004/0161118 | A1 | 8/2004 | Chu |
| 2004/0233167 | A1 | 11/2004 | Braun et al. |
| 2005/0001817 | A1 * | 1/2005 | Lauffenburger et al. ..... 345/166 |
| 2005/0057509 | A1 | 3/2005 | Mallett et al. |

OTHER PUBLICATIONS

Microsoft Corporation: "Difference Between Mouse Sensitivity and Acceleration Controls" URL: http://web.archive.org/web/20031031055533/http://support.microsoft.com/default.aspx?scid=kb;en-us;70180>retrieved on Jul. 28, 2005!
Designing the User Interface, pp. 335 and 336 (Ben Shneiderman) 3rd edition, reprinted with corrections in Mar. 1998.
Search Report mailed Aug. 8, 2005, for EP 05251001.3.
Notice of Allowance mailed Oct. 7, 2011, for CA 2,537,036.
Notice of Allowance mailed May 25, 2011, for EP 05251001.3.
Examination report mailed Apr. 9, 2008, for EP 05251001.3.
Office Action mailed Feb. 23, 2010, for CA 2,537,036.

* cited by examiner

HANDHELD ELECTRONIC DEVICE, CURSOR POSITIONING SUB-SYSTEM AND METHOD EMPLOYING CURSOR SCALING CONTROL

CROSS-REFERENCE TO RELATED APPLICATIONS

This application is a continuation of U.S. application Ser. No. 11/062,719, filed on 22 Feb. 2005. U.S. application Ser. No. 11/062,719 is fully incorporated by reference herein.

BACKGROUND OF THE INVENTION

1. Field of the Invention

The invention relates generally to handheld electronic devices and, more particularly, to a handheld electronic device including a cursor positioning device such as, for example, a track ball. The invention also relates to a method of scaling the input pulses from a cursor positioning device such as, for example, a track ball.

2. Background Information

Most cursor positioning devices (e.g., without limitation, a mouse; a track ball; a touchscreen; a tablet; another such pointing or cursor positioning device) have a predetermined speed of response. For example, many track balls have one cursor movement event per pulse from the track ball device. This speed of response can be the proper speed for some applications, but may be too slow or too fast for other applications. The actual count of cursor movement events depends upon the number of pulses per revolution of the track ball and the size of the ball. For example, one known track ball outputs a count of pulses (e.g., without limitation, about 11) for each 360° of rotation. In this example, there is a corresponding positive (i.e., zero to one) transition or a corresponding negative (i.e., one to zero) transition for about every 16.36° of rotation. Another known track ball outputs an audible sound (e.g., a "click" sound) for each of the output pulses.

U.S. Pat. No. 6,252,579 discloses that a computer mouse and other mouse-type devices, such as a track ball, are typically used as a position control device in which displacement of the mouse in a planar workspace is directly correlated to displacement of a cursor displayed on a screen. This displacement correlation may not be a one-to-one correspondence, since the cursor position may be scaled according to a constant mapping from the mouse position (e.g., the mouse may be moved a distance of one inch on a mouse pad which causes the controlled cursor to move four inches across the screen). In most cases, small movements of the mouse are scaled to large motions of the cursor on the screen to allow the user to easily point to targets in all areas of the screen. The user can typically manually change the scaling or "pointer speed" of the cursor to a desired level, which is the ratio or scaling factor of cursor movement to mouse movement, using menus provided in the operating system or application program.

U.S. Pat. No. 6,252,579 also discloses that scaled cursor movement in a graphical user interface (GUI) works well for coarse cursor motion, which is the broad, sweeping motion of the cursor that brings the cursor from one global area on the screen to another. Accuracy of cursor motion is not critical for coarse motion, but speed of the cursor is—ideally, the cursor traverses the desired distance on the screen quickly and efficiently. For such tasks, it is valuable for the cursor to move a large distance with small motions of the physical mouse hardware. However, a problem occurs in mouse-type devices when the user wishes to move the cursor a short distance or in small increments ("fine positioning"). For tasks in which accurate positioning of the cursor is needed, such as target acquisition tasks, the large scaling of mouse movement to cursor movement is inadequate or even harmful. For example, the user may wish to move the cursor onto a GUI target such as an icon or menu item. If very small motions of the mouse result in large cursor motion, then the user may simply lack the manual dexterity to acquire the target.

Mouse "ballistics" or "ballistic tracking" is typically used to alleviate the scaling problem for fine positioning of the cursor. Ballistics refers to the technique of varying the scaling between motion of a physical mouse and motion of a displayed cursor depending upon the velocity of the mouse in its workspace. The assumption is that if the user is moving the mouse very quickly, the user is likely performing a "coarse motion" task on the screen, and therefore the mouse driver scales small motions of the mouse to large motions of the cursor. Conversely, if the user is moving the mouse very slowly, then the user is likely performing a fine positioning task on the screen, and the mouse driver scales small motions of the mouse to small motions of the cursor. See U.S. Pat. Nos. 4,734,685; and 5,195,179. See, also, U.S. Pat. No. 5,477,508; and U.S. Patent Application Publication No. 2004/0233167.

U.S. Pat. No. 6,252,579 further discloses an enhanced cursor control algorithm in which the distance between a current mouse position and a workspace limit in the direction of the mouse's movement, and the distance between the cursor position and the screen limit corresponding to that physical limit are determined. This allows a local microprocessor to calculate a new scaling factor in real time for all positions of the mouse in its workspace, not just for regions close to the edge of the workspace. For example, the microprocessor examines the distance between the current mouse position and the workspace limit, and the distance between the cursor and the screen limits, and scales the cursor position accordingly. In one example, three "cursor speeds" (i.e., cursor scalings) are provided: coarse, fine, and intermediate. Coarse and fine speeds are constant mappings of cursor to mouse position allowing different degrees of control. However, the intermediate speed can use the enhanced cursor control algorithm to vary the scaling factor according to the offset between local and display frames. In an alternative embodiment, the microprocessor determines the distance of the mouse and cursor to limits on all sides, such that four different scaling factors can be stored and the one that corresponds to the cursor's direction is used.

There remains the need for a comfortable and intuitive user interface employing a cursor control device, such as a track ball. Accordingly, there is room for improvement in handheld electronic devices including a cursor positioning device such as, for example, a track ball. There is also room for improvement in methods of scaling input pulses from a cursor positioning device.

SUMMARY OF THE INVENTION

These needs and others are met by the invention, which provides a cursor controller adapted to repetitively input device pulses of a cursor positioning device and to responsively output to an operating system a plurality of cursor movement events. The cursor controller is adapted to be controlled by the operating system or by applications to learn which one of the applications is active and to automatically scale a number of the cursor movement events for a corresponding number of the device pulses based upon a corresponding predetermined scaling value of the active one of the applications.

For example, the cursor positioning device may be a track ball that produces a digital signal when the ball is moved, but has no feedback to the user itself. An audible output device, such as a Piezo buzzer, may be employed to provide audible feedback with the curser on the screen providing visual feedback. The pulses given by the track ball determine direction, speed in a single motion, as well as how often the ball is moved. From this information and the knowledge of what application is active, the "feel" and response of the track ball are modified. For example, different responses may be provided in different applications such as, for example, a text editing or viewing application, an application employing a menu, a main ribbon application, and other applications. The software determines the user's intentions and changes the feedback to match the situation.

In accordance with one aspect of the invention, a cursor positioning sub-system for a handheld electronic device including an operating system and a plurality of applications having a plurality of predetermined scaling values comprises: a cursor positioning device adapted to output a plurality of device pulses; and a cursor controller adapted to repetitively input the device pulses of the cursor positioning device and to responsively output to the operating system a plurality of cursor movement events, the cursor controller being further adapted to be controlled by the operating system or by the applications to learn which one of the applications is active and to automatically scale a number of the cursor movement events for a corresponding number of the device pulses based upon a corresponding one of the predetermined scaling values of the active one of the applications.

The cursor positioning device may be a track ball including four outputs for the device pulses. The cursor controller may be a track ball resolution controller adapted to periodically input the device pulses from the four outputs of the track ball, count the device pulses for each of four different directions, and determine whether a count for any of the different directions is equal to a predetermined count and, if so, responsively output a direction pulse for a corresponding one of the different directions.

The cursor controller may comprise a movement detection routine adapted to periodically input the device pulses from the cursor positioning device, count the device pulses for each of four different directions, and determine whether a count for any of the different directions is equal to a predetermined count and, if so, responsively output a direction pulse for a corresponding one of the different directions; and a velocity detection routine adapted to input the direction pulse for each of the different directions, determine a time between successive ones of the direction pulses for each of the different directions, determine one of a plurality of modes based upon the time, and responsively increase or decrease a ratio of a number of the cursor movement events per a corresponding number of the direction pulses.

The velocity detection routine may be adapted to accept input from the operating system or one of the applications to remain in one of the modes.

One of the modes may be determined when the time is greater than a predetermined time. The velocity detection routine may send one of the cursor movement events to the operating system for a predetermined count of a plurality of the direction pulses.

One of the modes may be determined when the time is less than a predetermined time. The velocity detection routine may send a predetermined count of a plurality of the cursor movement events to the operating system for each of the direction pulses.

The cursor controller may further comprise an audible output routine adapted to audibly enunciate the cursor movement events. The audible output routine may output one audible event for each of the cursor movement events when a time between successive ones of the cursor movement events is greater than a predetermined time and, alternatively, to disable the audible event when the time between successive ones of the cursor movement events is less than the predetermined time.

As another aspect of the invention, a handheld electronic device comprises: an input sub-system comprising a cursor positioning device adapted to output a plurality of device pulses; an output sub-system comprising a display including a cursor; an operating system adapted to receive cursor movement events; a plurality of applications including a plurality of predetermined scaling values; a processor cooperating with the input sub-system, the output sub-system and the operating system to move the cursor; and a cursor controller routine adapted be controlled by the operating system or by the applications to learn which one of the applications is active and to automatically scale a number of the cursor movement events for a corresponding number of the device pulses based upon a corresponding one of the predetermined scaling values of the active one of the applications, the cursor controller routine comprising: a movement detection routine adapted to repetitively input the device pulses of the cursor positioning device, count the device pulses for each of four different directions, and determine whether a count for any of the different directions is equal to a predetermined count and, if so, responsively output a direction pulse, and a velocity detection routine adapted to input the direction pulse for each of the different directions, determine a time between successive ones of the direction pulses for each of the different directions, determine one of a plurality of modes based upon the time, and responsively adjust and output the number of the cursor movement events to the operating system.

The operating system may cooperate with the applications, one of the applications may inform the operating system which one of the applications is currently active, and the operating system may responsively set the predetermined count.

As another aspect of the invention, a method of positioning a cursor for a handheld electronic device including an operating system and a plurality of applications having a plurality of predetermined scaling values comprises: employing a cursor positioning device to output a plurality of device pulses; repetitively inputting the device pulses and responsively outputting to the operating system a plurality of cursor movement events; and learning which one of the applications is active and automatically scaling a number of the cursor movement events for a corresponding number of the device pulses based upon a corresponding one of the predetermined scaling values of the active one of the applications.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the expression "a number of" and variations thereof shall refer broadly to any quantity or count of one or more.

As employed herein, the term "cursor" shall expressly include, but not be limited by, a pointer, a movable item or other visual cue (e.g., without limitation, a graphical object; a special symbol; an outline; a rectangle; an underline character; a blinking item) used to mark a position or point to another item on a display, in order to, for example, indicate position for data entry or for selection of the other item.

The invention is described in association with a wireless handheld electronic device, although the invention is applicable to a wide range of cursor positioning methods, handheld electronic devices and cursor positioning sub-systems therefore.

Figure 1:
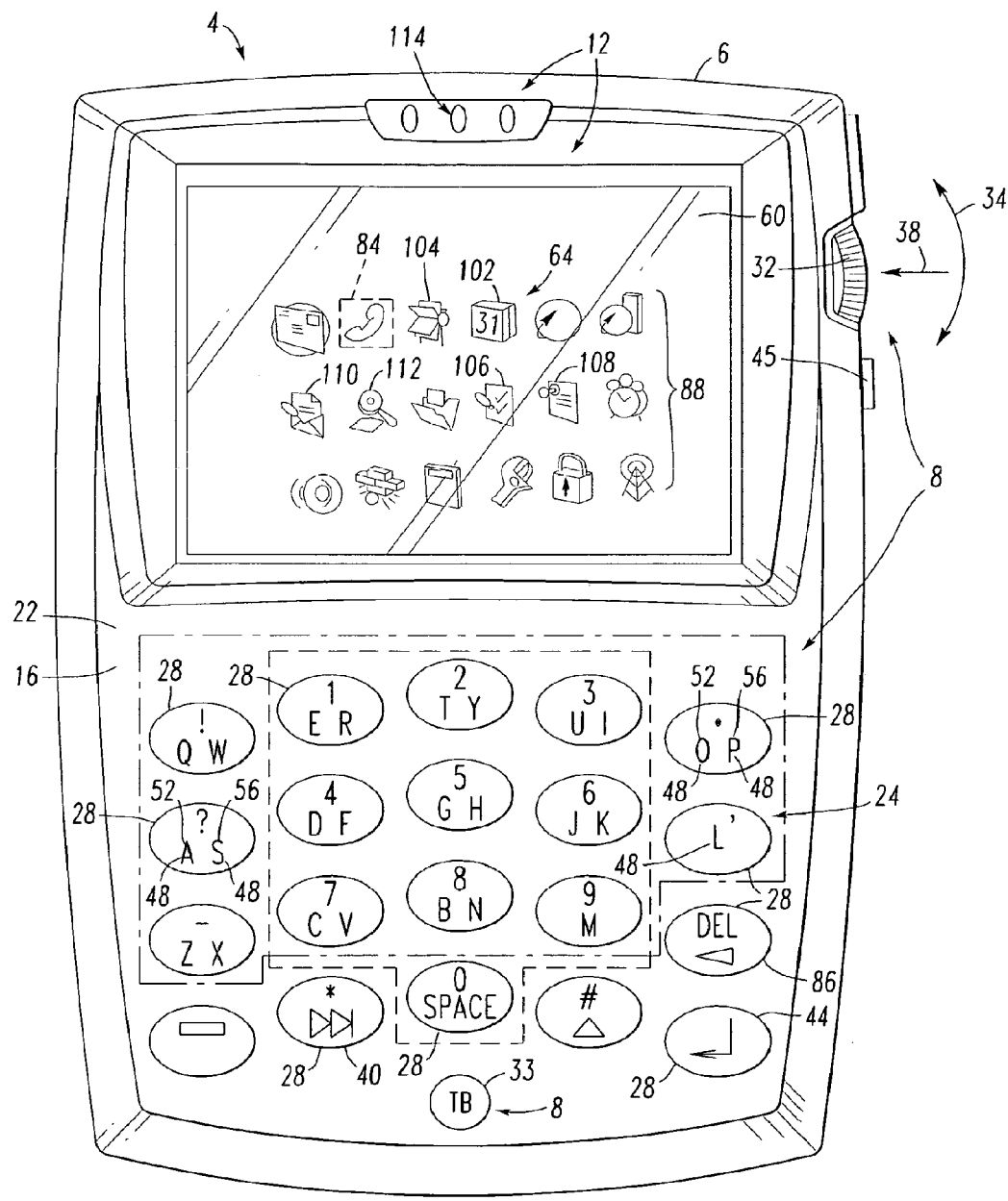
FIG. 1 is a top plan view of a handheld electronic device in accordance with the invention.
Figure 2:
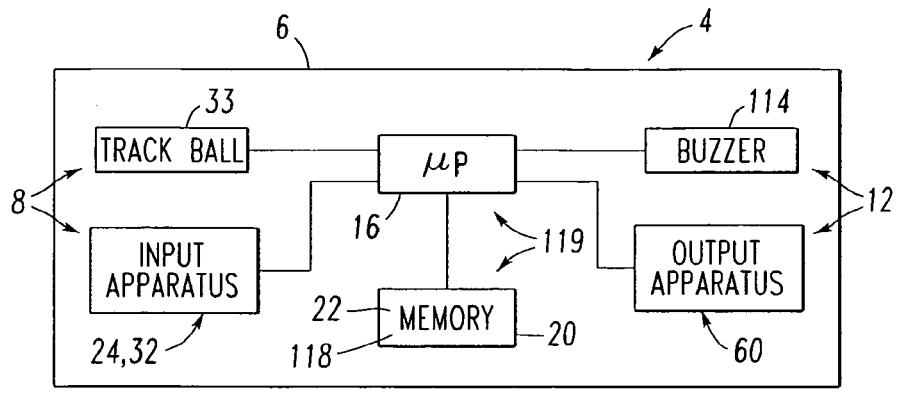
FIG. 2 is a schematic depiction of the handheld electronic device of FIG. 1.
Figure 3:
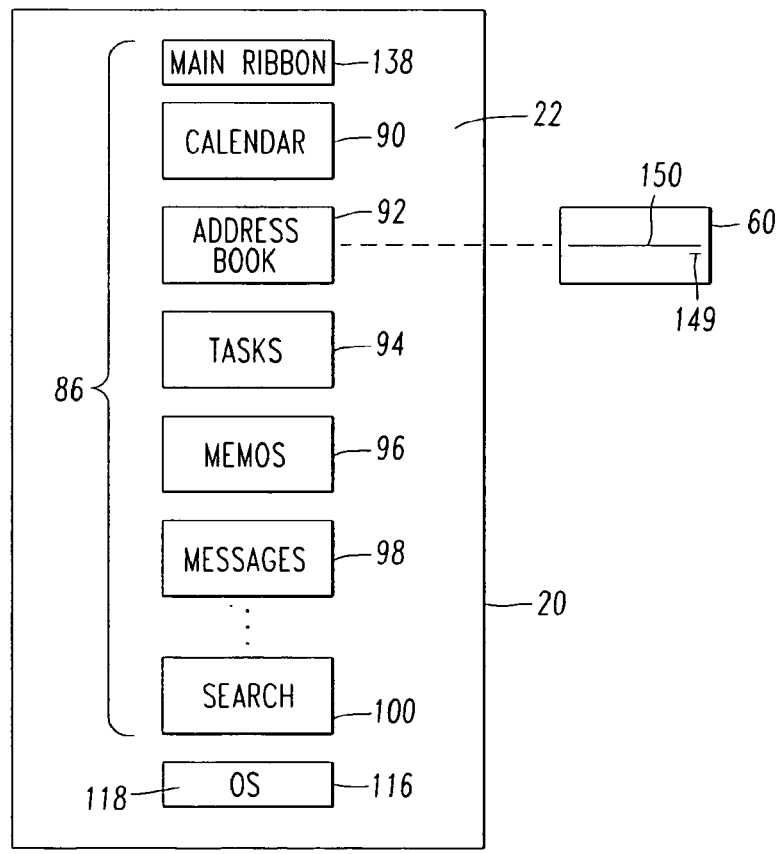
FIG. 3 is a schematic depiction of a portion of the memory of the handheld electronic device of FIG. 2.

A handheld electronic device 4 is indicated generally in FIG. 1 and is depicted schematically in FIG. 2. The example handheld electronic device 4 includes a housing 6 upon which are disposed a processor unit that includes an input apparatus 8, an output apparatus 12, a processor 16 (as shown in FIG. 2), a memory 20 (FIGS. 2 and 3), and a plurality of applications, such as routines 22 (FIGS. 2 and 3). The processor 16 may be, for instance, and without limitation, a microprocessor (µP) that responds to inputs from the input apparatus 8 and provides output signals to the output apparatus 12. The processor 16 also interfaces with the memory 20. Examples of handheld electronic devices are included in U.S. Pat. Nos. 6,452,588 and 6,489,950, which are incorporated by reference herein.

Example 1

As can be understood from FIG. 1, the input apparatus 8 includes a keypad 24, a thumbwheel 32 and a suitable cursor positioning device, such as the example track ball (TB) 33. The keypad 24 is in the example form of a reduced QWERTY keyboard including a plurality of keys 28 that serve as input members. The wireless handheld electronic device 4, as shown, employs a user interface including, for example, the QWERTY keyboard, the thumbwheel 32 and the track ball 33 for user interface navigation. Rather than burden the user, the relatively difficult choices are preferably made by the wireless handheld electronic device 4.

The expression "reduced" and variations thereof, in the context of a keyboard, a keypad, or other arrangement of input members, shall refer broadly to an arrangement in which at least one of the input members has assigned thereto a plurality of characters within a given set, such as a plurality of letters, for example, in the set of Roman letters, for example, thereby potentially rendering ambiguous an intended result of an actuation of the at least one of the input members. As a result, one of the routines 22 (FIG. 2) is dedicated to a disambiguation function.

Example 2

It is noted, however, that the keypad 24 may be of other configurations, such as an AZERTY keyboard, a QWERTZ keyboard, a Dvorak keyboard, or other keyboard or keypad arrangement, whether presently known or unknown, and either reduced or not reduced (i.e., full).

Example 3

As an alternative to or in addition to the thumbwheel 32 and/or the track ball 33, a wide range of one or more pointing or cursor positioning devices (e.g., a touch pad; a joystick button; a mouse; a touchscreen; a tablet; another such pointing or cursor positioning device), whether presently known or unknown, may be employed.

Example 4

Continuing to refer to FIG. 1, the keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Among the keys 28 of the keypad 24 are a <NEXT> key 40 and an <ENTER> key 44. The <NEXT> key 40, wherein, for example, "<NEXT>" may be a symbol or may be the word "next" provided (e.g., printed) on the key, can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation. Another key, the <ESC> key 45 is disposed on the side of the housing 6 adjacent the thumbwheel 32, although the same or similar key may be disposed as part of the keypad 24.

As can further be seen in FIG. 1, many of the keys 28 include a number of characters 48 disposed thereon. In the example depiction of the keypad 24, many of the keys 28 include two characters, such as including a first character 52 and a second character 56 assigned thereto. It is understood that the expression "characters" shall broadly be construed to include letters, digits, symbols and the like and can additionally include ideographic characters, components thereof, and the like.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

Among the keys 28 of the keypad 24 additionally is a <DEL> key 86 that can be provided to delete a text entry.

The memory 20 is depicted schematically in FIG. 3. The memory 20 can be any of a variety of types of internal and/or external storage media such as, without limitation, RAM, ROM, EPROM(s), EEPROM(s) and/or the like that provide a storage register for data storage such as in the fashion of an internal storage area of a computer, and can be volatile memory or nonvolatile memory. The memory 20 additionally includes the routines 22 for the processing of data. The routines 22 can be in any of a variety of forms such as, without limitation, software, firmware, and the like.

Referring again to FIG. 1, the output apparatus 12 includes a display 60 upon which is provided an example output 64. The display 60 may also include a cursor 84 (FIG. 1) that depicts generally where the next input or selection from the input apparatus 8 will be received. The output 64 of FIG. 1 is depicted as displaying a home screen that represents a number of applications 86 (FIG. 3 shows some of the example possible applications 86) depicted as corresponding discrete icons 88. The applications 86 include, for example, a Calendar application 90, an Address Book application 92, a Tasks application 94, a MemoPad (Memos) application 96, a Messages application 98 and a Search application 100. The corresponding icons 88 include, for example, the Calendar icon 102, the Address Book icon 104, the Tasks icon 106, the MemoPad icon 108, the Messages icon 110 and the Search icon 112, respectively.

In FIG. 1, the home screen output 64 is currently active (e.g., outputting to the display 60; running in the foreground of the display 60) and would constitute the main ribbon application 138 of FIG. 3. One of the other applications 86, such as the Messages application 98, can be initiated from the home screen output 64 by providing a suitable input through the input apparatus 8, such as by suitably rotating the thumbwheel 32 and providing a selection input by translating the thumbwheel 32 in the direction indicated by the arrow 38. For example, the home screen output 64 displays the icon 112 associated with the Search application 100, and accepts input from the input apparatus 8 to launch a search from that icon. Alternatively, one of the applications 86 can be initiated from the home screen output 64 by providing another suitable input through the input apparatus 8, such as by suitably rotating the track ball 33 and providing a selection input by, for example, pushing the track ball 33 (e.g., somewhat similar to the thumbwheel 32, except into the plane of FIG. 1).

Although not expressly shown in FIG. 1, the icons 88 may be part of a ribbon (not shown) including a series of icons that form a device toolbar (not shown) or taskbar (not shown) on the home screen output 64.

The output apparatus 12 may also include a suitable enunciator, such as the example Piezo buzzer 114 (FIGS. 1 and 2).

The memory 20 (FIG. 3) further includes an operating system (OS) 116 and a cursor controller routine, such as a track ball resolution controller routine 118, which is preferably part of the OS. The processor 16 (FIGS. 1 and 2) and the track ball resolution controller routine 118 form a cursor controller, such as the example track ball resolution controller 119 (FIG. 2).

Example 5

Figure 4:
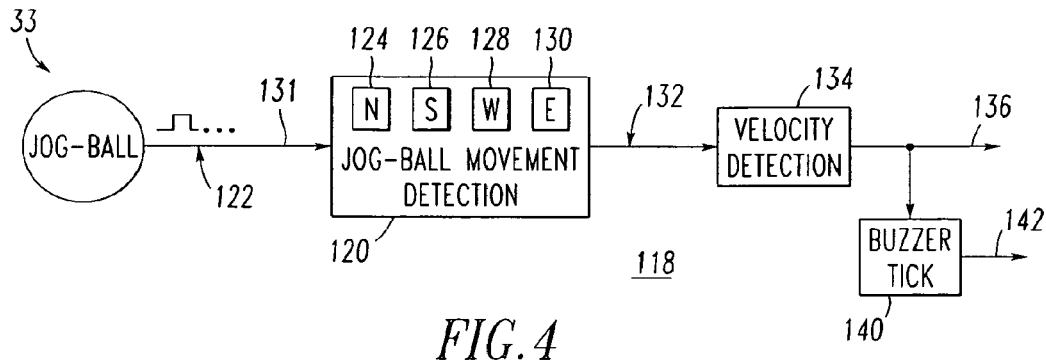
FIG. 4 is a block diagram of a software routine that receives and processes pulses from the track ball of FIG. 1, outputs movement events to the operating system of FIG. 3 and outputs corresponding digital ticks to the audible output device of FIG. 1.

Referring to FIG. 4, the track ball resolution controller routine 118 is shown. A jog-ball movement detection routine 120 wakes up periodically (e.g., without limitation, about every 4 ms) and inputs (e.g., reads; samples) four outputs 122 (e.g., without limitation, from Hall sensors (not shown)) of the track ball 33 of FIG. 1. The routine 120 employs four counters (e.g., counter N 124; counter S 126; counter W 128; counter E 130) that count up received jog-ball pulses 131 (e.g., one count for each transition, both positive and negative) for each of the four directions. If the value of one of these counters 124,126,128,130 reaches a suitable minimum number of necessary pulses (e.g., without limitation, about 2 or about 3) for one detection, then the routine 120 outputs one direction pulse 132 (e.g., direction_pulse N; direction_pulse S; direction_pulse W; direction_pulse E) to a velocity detection routine 134. The routine 120 also employs a suitable timeout period (e.g., without limitation, about 100 ms; any suitable time) for the counters 124,126,128,130 to reset a counter for a corresponding direction if no jog-ball pulses 131 for that direction are received within the timeout period.

The velocity detection routine 134 functions like a filter. Based on which mode it is in, as described, below, in connection with Examples 6-11, this routine 134 increases or decreases the number of directional movement events 136 (e.g., N_movement; S_movement; W_movement; E_movement) that are sent to the operating system (OS) 116 (FIG. 3). The modes are normally decided based on the delay between the direction pulses 132 as sent from the routine 120. Also, applications like, for example, the main ribbon application 138 (FIG. 3), an application (e.g., 86; one or more of the routines 90,92,94,96,98,100 (FIG. 3)) that processes a menu, an application, such as routine 94 (FIG. 3), that processes a list (e.g., without limitation, a task list), or an application (e.g., 86; one or more of the routines 90,92,94,96,98,100 (FIG. 3)) that processes a text field, can force the routine 134 to stay in a particular mode, as is discussed, below, in connection with FIG. 5.

The velocity detection routine 134 is adapted to input the direction pulses 132 for each of the different directions (e.g., N, S, W and E of the display 60 (FIG. 1)), determine a time between successive ones of the direction pulses 132 for each of the different directions, determine one of a plurality of modes based upon that time (e.g., all directions behave the same in a particular mode; the active application, in addition to the time, determines the mode) and responsively increase or decrease a ratio of a number of the cursor movement events 136 per a corresponding number of the direction pulses 132 for each of the different directions.

Example 6

The routine 134 employs, for example, a number of different modes: (1) Slow mode; (2) Special Slow mode; (3) Fast mode; (4) Special Fast mode; and (5) Normal mode, as are discussed below in connection with Examples 7-11.

Example 7

The Slow mode of the routine 134 may be used, for example, for scrolling through options in menus. For example, when the time between the direction pulses 132 for each direction between any one transition and the subsequent transition (negative or positive) is more than a predetermined time (e.g., without limitation, about 125 ms), the routine 134 enters this mode. In the Slow mode, the routine 134 ignores, for example, every other direction pulse 132. Hence, only one movement event 136 is sent to the OS 116 out of two corresponding direction pulses 132 from the routine 120.

Example 8

The Special Slow mode may be used, for example, for navigating in the main ribbon application 138 (FIG. 3). The Special Slow mode is like the Slow Mode except that the minimum number of direction pulses 132 from the routine 120 needed to output one corresponding movement event 136 is increased from two to three direction pulses 132. This implies that relatively longer strokes of the track ball 33 (FIG. 1) are needed for one movement event 136.

Example 9

The Fast mode may be used, for example, for a text editing or viewing application. For example, when the time between the direction pulses 132 is less than a predetermined time (e.g., without limitation, about 44 ms), the routine 134 enters this mode. In the Fast mode, two movement events 136 are sent to the OS 116 (FIG. 3) for each direction pulse 132 from the routine 120. Furthermore, the routine 134 allows a delay (e.g., a Replacing-Thumb-Delay) up to a predetermined time (e.g., without limitation, about 625 ms) for the user to replace his/her thumb over the track ball 33 (e.g., jog-ball) and continue to roll it in the same direction. If this happens, then the routine 134 still stays in the Fast mode.

Example 10

The Special Fast mode may be used, for example, for detecting relatively very fast and short jog-ball rolling in a text editing or viewing application. The Special Fast mode is like the Fast Mode except that if, for example, from one to six direction pulses 132 are received from the routine 120 before the Replacing-Thumb-Delay is detected, then the routine 134 switches to this mode. When in this mode, five (rather than two as in Example 9) movement events 136 are sent to the OS 116 (FIG. 3) for each direction pulse 132.

Example 11

The Normal mode is employed when not in the Slow (or Special Slow) mode or the Fast (or Special Fast) mode. Here, for each direction pulse 132, one corresponding movement event 136 is sent to the OS 116.

The Buzzer Tick routine 140 outputs a digital "tick" 142 to the Piezo buzzer 114 (FIGS. 1 and 2) to provide an audible click. This routine 140 has two modes: (1) Normal mode; and (2) End Of Field mode.

Example 12

The Normal mode of the Buzzer Tick routine 140 is employed to output the digital "tick" 142 for each of the movement events 136 received from the routine 134 unless the time between those movement events is less than a predetermined time (e.g., without limitation, about 31 ms). In that case, the routine 140 ignores the event 136 and disables the audible sound (e.g., outputs no digital tick 142). This functionality is advantageously employed to avoid getting a continuous sound from the buzzer 114 when the routine 134 is in the Fast mode or the Special Fast mode.

Example 13

The End Of Field mode of the Buzzer Tick routine 140 is employed to inform the user that no cursor movement is possible. Also, applications, such as 86 (FIG. 3), can set the routine 140 to this mode. Here, the Piezo buzzer 114 (FIGS. 1 and 2) does not output the audible click more than once in a predetermined time (e.g., without limitation, about 375 ms). The audible click sound from Piezo buzzer 114 has a relatively lower frequency in terms of number of clicks per pulse, preferably a relatively higher pitch, and preferably a relatively lower volume than the audible clicks from the Normal mode of the routine 140.

Example 14

As an alternative to Examples 9 and 10, in a text editing or viewing application, a relatively slow navigation (e.g., two direction pulses 132 per audible click) may be employed. Moving the track ball 33 relatively slowly allows a very fine track ball motion to make the cursor move and the audible click occur on every second of such direction pulses 132.

Example 15

As an alternative to Example 14, normal navigation (e.g., one direction pulse 132 per audible click) may be employed for scanning an e-mail and/or a line of an e-mail (e.g., in scrolling from line to line, up or down, or from character to character, side to side).

Example 16

As an alternative to Example 15, fast navigation (e.g., one direction pulse 132 per audible click, but visually the cursor jumps multiple lines at a time) may be employed not for scanning, but just for trying to get to some point in an e-mail message. This provides a relatively short, fast repeated curser movement.

There is also rapid motion in a particular direction. Here, if the user is scanning (e.g., when the Fast mode or Special Fast mode is detected for the left or right direction) to the right and hits an accidental two pulses (i.e., four transitions) in the up or down direction, then those pulses are ignored.

Example 17

As an alternative to Examples 7 and 8, for a menu application or for the main ribbon application 138, one audible click per direction pulse 132 is too fast. Hence, regardless of the speed or motion of the track ball 33, the motion is limited to one audible click per two of such pulses. Otherwise, when the user reaches the end of an e-mail message, a list or a menu, as determined by the active one (which informs the OS 116 of that active state) of the applications 86, the regular pulses stop and a less frequent and different audible click signifies the end.

Example 18

Figure 5:
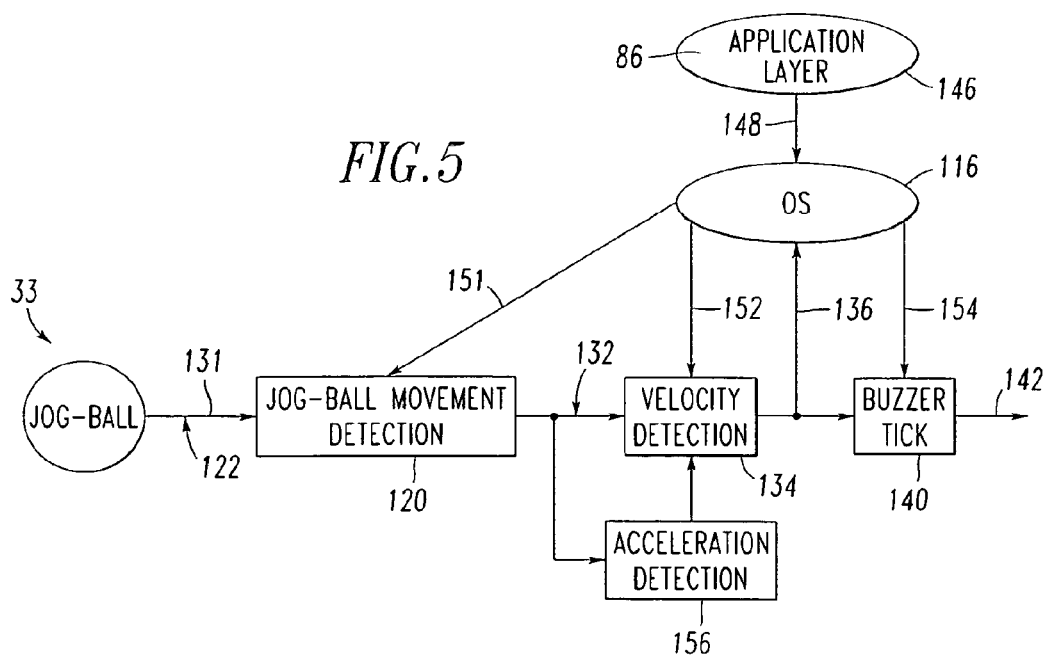
FIG. 5 is a block diagram of a software routine in accordance with another embodiment of the invention that receives and processes pulses from the track ball of FIG. 1, outputs movement events to the operating system of FIG. 3 and outputs corresponding digital ticks to the audible output device of FIG. 1.

Referring to FIG. 5, one of the applications 86 of the application layer 146 informs, at 148, the operating system (OS) 116 which one of the applications 86 is currently active and whether further cursor movement is not possible (e.g., the cursor 149 (FIG. 3) has reached the end of a text entry field 150 (e.g., "End of Field Mode")). Next, at 151, based upon the information from the active one of the applications 86, the OS 116 sets a minimum count of necessary jog-ball pulses 122 for one detection in the jog-ball movement detection routine 120. For example, this count is set to three for the main ribbon application 138 (FIG. 3) or to two for any of the other applications 86. In addition, at 152, based upon the information from the active one of the applications 86, the OS 116 forces the velocity detection routine 134 to stay in a suitable mode for the active application. Further, at 154, based upon the information from the active one of the applications 86, the OS 116 sets the buzzer tick routine 140 into or out of the "End of Field Mode".

In this example, an acceleration detection routine 156 detects acceleration information based on a changing time between direction pulses 132 from the manner in which the user rolls the track ball 33 as provided by those direction pulses 132. This information is employed to provide better synchronization between the user's intentions and the cursor movement as controlled by the cursor movement events 136 from the routine 134.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A cursor positioning sub-system for a communications device, the communications device including a memory that stores an operating system and a plurality of applications, the cursor positioning sub-system selecting a cursor navigation mode from a plurality of cursor navigation modes, the cursor positioning sub-system comprising:
   a cursor positioning device that generates a device pulse when actuated, the device pulse corresponding to one of a plurality of directions for navigating a cursor on a display;
   a movement detector that is communicatively coupled to the cursor positioning device and the operating system, the movement detector including a counter that counts the device pulse and increments a count value for the corresponding one of the plurality of directions, the movement detector being configured to:
   receive the device pulse;
   receive a signal from the operating system, the signal identifying an active application selected from the plurality of applications;
   set a minimum count value threshold for the plurality of directions based on the identified active application;
   generate a direction pulse when the count value threshold is reached for one of the plurality of directions, the direction pulse being associated with the corresponding direction;
   reset the counter for the corresponding direction that reaches the count value threshold; and
   reset the counter for the corresponding plurality of directions if the movement detector does not receive the device pulse associated with the plurality of directions within a predefined time period;
   a velocity detector that is communicatively coupled to the movement detector, the velocity detector defining the plurality of cursor navigation modes based on at least one of the active application and a time period between corresponding direction pulses, the velocity detector configured to:
   receive the direction pulse;
   determine the direction associated with the direction pulse;
   determine the time period between receiving the direction pulse and a previous direction pulse that corresponds to a same direction;
   compare the determined time period with a plurality of predetermined time periods associated with the plurality of cursor navigation modes;
   select one of the plurality of cursor navigation modes based on at least one of the determined time period and the active application; and
   generate a cursor movement event that corresponds to the selected cursor navigation mode, the cursor movement event being a multiple of the determined time period between corresponding direction pulses.

2. The cursor positioning sub-system of claim 1, wherein the velocity detector is further configured to receive a signal from the operating system to maintain the selected mode.

3. The cursor positioning sub-system of claim 1, wherein the velocity detector selects one of the plurality of cursor navigation modes, including a slow mode, a special slow mode, a fast mode, a special fast mode and a normal mode.

4. The cursor positioning sub-system of claim 3, wherein the normal mode is a default mode.

5. The cursor positioning sub-system of claim 1, further comprising an audible device that is communicatively coupled to the velocity detector and the operating system, the audible device configured to:
   receive the cursor movement event; and
   receive an audible signal from the operating system, the audible signal indicating one of an end of field mode and a normal mode.

6. The cursor positioning sub-system of claim 5, wherein the audible signal changes an audible alert during the end of field mode.

7. The cursor positioning sub-system of claim 1, wherein the velocity detector selects one of the plurality of modes when the time period between receiving the direction pulse and the previous direction pulse that corresponds to the same direction is greater than a first predetermined time and is less than a second, larger predetermined time.

8. The cursor positioning sub-system of claim 5, wherein the audible device limits the audible signal to a predetermined maximum rate or frequency.

9. The cursor positioning sub-system of claim 1, further comprising an acceleration detector that is communicatively coupled to the movement detector and the velocity detector, the acceleration detector detecting acceleration information based on a changing time period between direction pulses, the acceleration information being provided to the velocity detector to modify generation of the cursor movement event.

10. The cursor positioning sub-system of claim 1 wherein the cursor positioning device comprises a touch pad, a joystick, a mouse, a touchscreen, an input pad, a trackball, or a tablet.

11. A communications device that is programmed to select a cursor navigation mode from a plurality of cursor navigation modes, the communications device comprising:
   a display;
   a cursor positioning device that generates a device pulse when actuated, the device pulse corresponding to one of a plurality of directions for navigating a cursor on the display;
   a storage device that stores an operating system and a plurality of applications;
   a processor that is communicatively coupled to the display, the cursor positioning device, and the storage device, the processor being configured to execute instructions for:
   receiving the device pulse;
   receiving a signal from the operating system, the signal identifying an active application selected from the plurality of applications;
   setting a minimum count value threshold for the plurality of directions based on the identified active application;
   generating a direction pulse when the count value threshold is reached for one of the plurality of directions, the direction pulse being associated with the corresponding direction;
   resetting the counter for the corresponding direction that reaches the count value threshold; and
   resetting the counter for the corresponding plurality of directions if the processor does not receive the device pulse associated with the plurality of directions within a predefined time period;

determining the direction associated with the direction pulse;

determining the time period between receiving the direction pulse and a previous direction pulse that corresponds to a same direction;

comparing the determined time period with a plurality of predetermined time periods associated with the plurality of cursor navigation modes;

selecting one of the plurality of cursor navigation modes based on at least one of the determined time period and the active application; and generating a cursor movement event that corresponds to the selected cursor navigation mode, the cursor movement event being a multiple of the determined time period between corresponding direction pulses.

12. The communications device of claim 11, wherein the plurality of cursor navigation modes includes a slow mode, a special slow mode, a fast mode, a special fast mode and a normal mode.

13. The communications device of claim 11, wherein the normal mode is a default mode.

14. The communications device of claim 11, wherein the processor is further configured to execute instructions for:

receiving an audible signal from the operating system, the audible signal indicating one of an end of field mode and a normal mode.

15. The communications device of claim 11, wherein the plurality of applications stored in the storage device include a text editing or viewing application, an menu processing application, a list processing application, and a text field processing application.

16. A non-transitory computer readable medium storing computer code that when loaded into a communications device adapts the communications device to select a cursor navigation mode from a plurality of cursor navigation modes, the communications device including a cursor positioning device that generates a device pulse when actuated, the device pulse corresponding to one of a plurality of directions for navigating a cursor on a display, the communications device further including a storage device that stores an operating system and a plurality of applications; the computer readable medium having instructions that are executable to:

receive the device pulse;

receive a signal from the operating system, the signal identifying an active application selected from the plurality of applications;

set a minimum count value threshold for the plurality of directions based on the identified active application;

generate a direction pulse when the count value threshold is reached for one of the plurality of directions, the direction pulse being associated with the corresponding direction;

reset the counter for the corresponding direction that reaches the count value threshold; and reset the counter for the corresponding plurality of directions if the processor does not receive the device pulse associated with the plurality of directions within a predefined time period;

determine the direction associated with the direction pulse;

determine the time period between receiving the direction pulse and a previous direction pulse that corresponds to a same direction;

compare the determined time period with a plurality of predetermined time periods associated with the plurality of cursor navigation modes;

select one of the plurality of cursor navigation modes based on at least one of the determined time period and the active application; and generate a cursor movement event that corresponds to the selected cursor navigation mode, the cursor movement event being a multiple of the determined time period between corresponding direction pulses.

17. The non-transitory computer readable medium of claim 16, wherein the computer readable medium further includes instruction that are executable to select among the plurality of cursor navigation modes that include a slow mode, a special slow mode, a fast mode, a special fast mode and a normal mode.

18. The non-transitory computer readable medium of claim 17, wherein the computer readable medium further includes instruction that are executable to set the normal mode as a default mode.

19. The non-transitory computer readable medium of claim 16, wherein the computer readable medium further includes instruction that are executable to receiving an audible signal from the operating system, the audible signal indicating one of an end of field mode and a normal mode.

20. The non-transitory computer readable medium of claim 16, wherein the computer readable medium further includes instruction that are executable to limit the audible signal to a predetermined maximum rate or frequency.

* * * * *